Aug. 9, 1960  R. W. FABERÉ ET AL  2,948,546
STEERING LINKAGE FOR WHEEL-TYPE TRACTOR
Filed Feb. 13, 1959  2 Sheets-Sheet 2
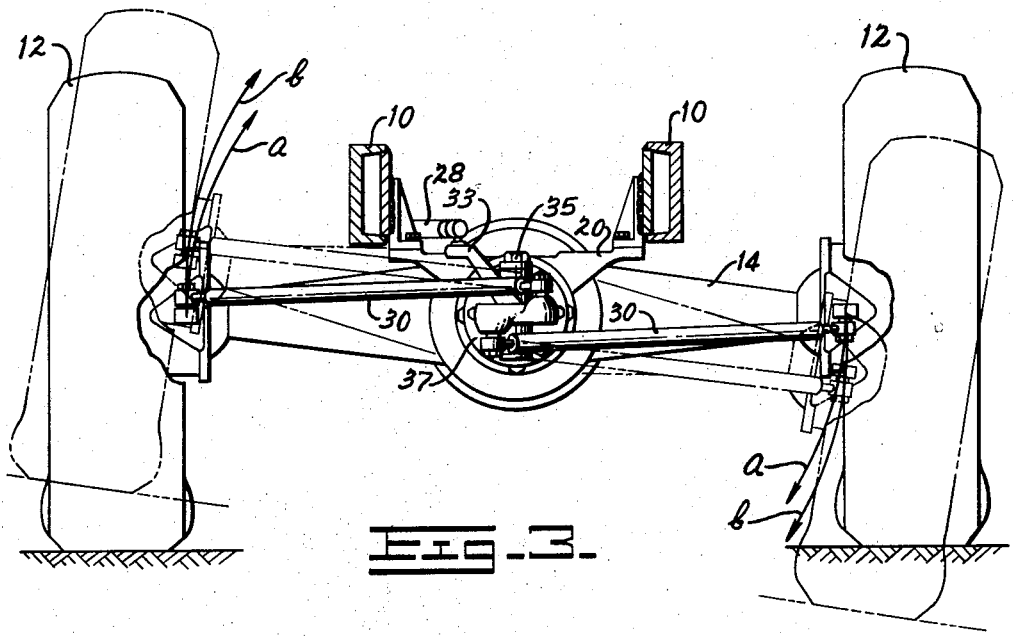
Fig-3-
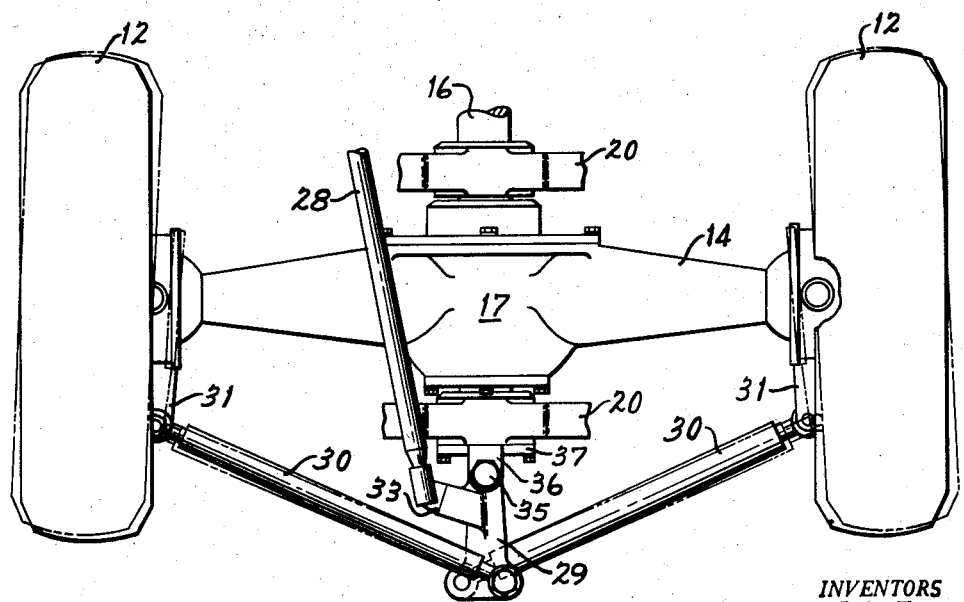
Fig-4-
INVENTORS
RAYMOND W. FABERÉ'
BY ROBERT C. WEGNER
Fryer and Johnson
ATTORNEYS United States Patent Office 2,948,546
Patented Aug. 9, 1960

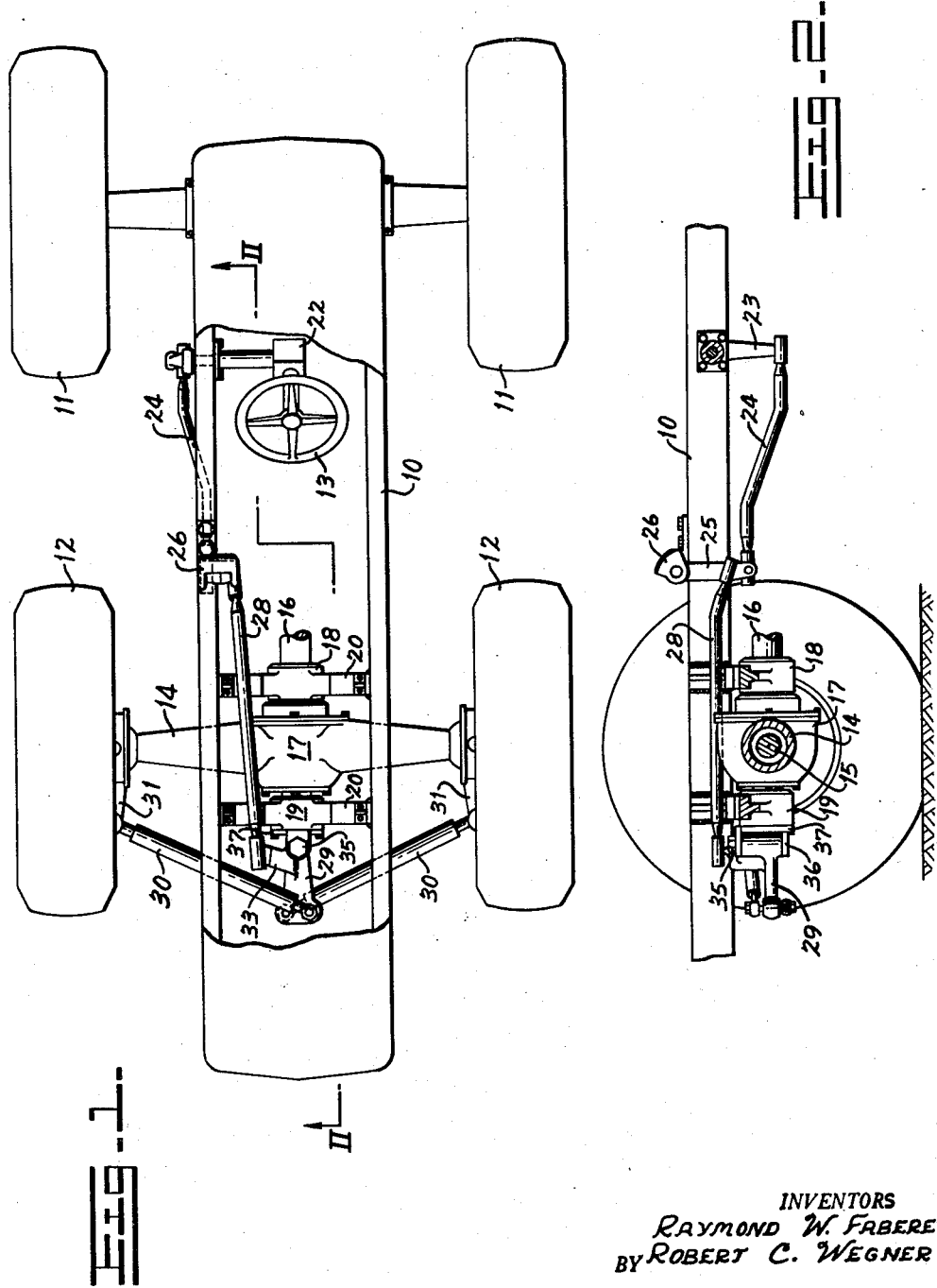

2,948,546

STEERING LINKAGE FOR WHEEL-TYPE TRACTOR

Raymond W. Faberé, Naperville, and Robert C. Wegner, Oswego, Ill., assignors to Caterpillar Tractor Co., Peoria, Ill., a corporation of California Filed Feb. 13, 1959, Ser. No. 793,113

1 Claim. (Cl. 280—95)

This invention relates to steering linkage for wheel-type tractors or the like and particularly to such linkage on tractors where the steerable wheels are on an oscillatory axle as is common practice where the rear wheels are used for steering.

In many tractors, the rear axle is mounted to oscillate in a vertical plane about a central pivot to enable the wheels to rise and fall as they pass over uneven terrain. In order to steer these wheels, tie rods connect the wheels with a bellcrank lever which is also connected to the drag link of the steering mechanism. Since the bellcrank is pivotally mounted on the axle, oscillation of the axle varies the effective length of the drag link imparting oscillation to the bellcrank and causing unintended steering of the tractor. The operator endeavors to keep the tractor on its true course and is, therefore, constantly fighting the steering wheel while the tractor is moving over uneven ground. This causes operator fatigue and a yawing motion of a tractor which is undesirable and inefficient.

It is the object of the present invention to provide a steering mechanism for tractors or the like which overcomes the difficulty set forth above and also to provide a steering mechanism of the kind described which produces a desirable differential in turn angle of the steerable wheels to enable easy steering and prevent tire wear or scrub which occurs without such differential in turn angle.

Further objects and advantages of the invention are made apparent in the following specification wherein a preferred embodiment of the invention is described in detail by reference to the accompanying drawings.

In the drawings:

Fig. 1 is a plan view of a wheel-type tractor with the major part of the body portion broken away to disclose steering mechanism embodying the present invention;

Fig. 2 is a fragmentary sectional view taken on the line II—II of Fig. 1;

Fig. 3 is a view in rear elevation of the frame and rear axle of the tractor illustrating one effect obtained through the present invention; and Fig. 4 is a plan view of the structure shown in Fig. 3 with the frame removed.

Referring first to Fig. 1, a tractor frame 10 is shown as supported by a pair of front wheels 11 and a pair of rear wheels 12 controlled by a steering wheel 13. The rear wheels 12 are carried at the outer ends of an axle housing 14 on axles, one of which is shown at 15 in Fig. 2. Power from an engine, not shown, drives the wheels 12 through a drive shaft, a portion of which is illustrated at 16 through a conventional differential contained in a housing 17 formed integrally with the axle housing. The axle housing 14 is mounted for oscillation about a central point on trunnions which extend into trunnion bearings 18 and 19 carried on transverse brackets 20 suitably connected with the frame members 10 of the tractor. This mounting of the axle is described and claimed in a co-pending application of Karl J. Mogk entitled "Suspension for Oscillating Axles of Tractors and the Like," filed February 5, 1959, Serial No. 791,433 (of common ownership with the present application).

Steering motion is transmitted to the wheels 12 from the steering wheel 13 through a conventional worm and gear connection contained in a box 22 which imparts swinging movement to a lever 23, best shown in Fig. 2. A link 24 forms a connection between a lever 23 and a second lever 25 pivotally supported by a bracket 26 on one of the frame members 10. A drag link 28 is also pivoted to the lever 25 and at its rear end to a bellcrank lever 26 so that upon turning movement of the steering wheel 13, the bellcrank 29 is oscillated in a horizontal plane. A pair of tie rods 30 are pivoted at their inner ends to the bellcrank 29 and at their outer ends to arms 31 for imparting turning movement to the wheels which are pivotally supported at the outer ends of the axle housing 14 through conventional connections employed for this purpose.

In conventional steering linkages of this general type, the bellcrank 29 is pivotally supported on the axle housing 14. As a consequence, oscillation of the axle housing when the tractor is moving over uneven terrain effects raising and lowering of an arm 33 of the bellcrank 29 which extends upwardly and outwardly from the main portion of the bellcrank and to which the drag link 28 is pivoted. This raising and lowering movement of the arm 33 has the effect, because of its attachment with the drag link, of swinging the bellcrank 29 from side to side and through the tie rods 30 imparting slight steering motion to the wheels 12. The tractor, therefore, deviates from its true course as a result of this unintentional steering and the operator is put to the effort of attempting to correct the steering as it occurs. In the present invention, the bellcrank 29 is pivoted as by a pin 35 to a bracket 36 welded or otherwise suitably secured to a cap 37 which forms a cover plate for the rear trunnion bearing 19. This bearing is fixed with respect to the tractor frame and does not oscillate with the axle housing 14 so that the oscillation of the axle housing is not transmitted through the steering linkage to the steerable wheels.

Another advantage results from the structure best illustrated in Figs. 3 and 4 wherein the drag links 30 are shown as extending beyond the center line of the bellcrank lever 29 so that the link for the left hand steerable wheel extends beyond the center line of the tractor toward the right and the link for the right hand wheel extends beyond the center line of the tractor toward the left. Thus upon oscillation of the axle housing 14, the radius of the arc traveled by the outer ends of the tie rods is slightly longer than the radius of the arc traveled by a corresponding point on the axle housing. The arcs of the corresponding points on the axle housing are indicated by arrows *a* in Fig. 3 and the arcs described by the tie rods are indicated by the arrows *b*. It is apparent, therefore, that as the axle oscillates, the tie rods will exert a slight outward pressure on the arms 31 causing both wheels to toe in slightly which is not an undesirable feature and does not cause steering of the vehicle.

The crossed inner ends of the tie rods has the important advantage of providing a differential in the turn angle of the wheels which prevents excessive tire wear or tire scrub during turning. For example with the linkage shown, turning of the wheels 12 toward the left as viewed in Fig. 4 effects somewhat greater movement of the wheel on the right hand side than of that on the left, thus insuring a minimum of friction or scrubbing between the wheels and the ground.

We claim:

In combination with a tractor having an axle housing, a pivotal support for said housing including trunnion bearings fixedly mounted centrally of the frame, and steerable wheels at the ends of the axle housing, means to steer said wheels including a tie rod connected with each wheel and with a lever, a drag link connected with said lever and operable by a steering wheel, and a pivotal support on one of said trunnion bearings for said lever, said tie rods being arranged to cross each other at the ends where they are pivoted to said lever.

References Cited in the file of this patent

UNITED STATES PATENTS

| | | |
|---|---|---|
| 1,278,650 | Hewitt | Sept. 10, 1918 |
| 2,336,386 | Beck | Dec. 7, 1943 |
| 2,835,507 | Davies | May 20, 1958 |

FOREIGN PATENTS

| | | |
|---|---|---|
| 841,047 | France | Jan. 28, 1939 |